US012710799B2

(12) United States Patent
Dussaume et al.

(10) Patent No.: US 12,710,799 B2
(45) Date of Patent: Aug. 18, 2026

(54) METHOD FOR ACTIVATING A SERVICE OPERATED IN A LOCAL COMMUNICATION NETWORK, METHOD FOR PROCESSING A REQUEST TO WAKE UP AN ITEM OF EQUIPMENT CONNECTED TO THE LOCAL NETWORK AND CONFIGURED TO IMPLEMENT SAID SERVICE, METHOD FOR REQUESTING ACTIVATION OF A SERVICE, CORRESPONDING DEVICES, GATEWAY, EQUIPMENT, USER TERMINAL, SYSTEM AND COMPUTER PROGRAMS

(71) Applicant: Orange, Issy-les-Moulineaux (FR)

(72) Inventors: Philippe Dussaume, Chatillon (FR); Jean Philippe Javaudin, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 18/255,581

(22) PCT Filed: Dec. 2, 2021

(86) PCT No.: PCT/FR2021/052192
§ 371 (c)(1),
(2) Date: Jun. 1, 2023

(87) PCT Pub. No.: WO2022/117971
PCT Pub. Date: Jun. 9, 2022

(65) Prior Publication Data

US 2023/0418354 A1 Dec. 28, 2023

(30) Foreign Application Priority Data

Dec. 4, 2020 (FR) ...................................... 2012732

(51) Int. Cl.
*G06F 1/3209* (2019.01)
*G06F 1/3287* (2019.01)
(Continued)

(52) U.S. Cl.
CPC .......... *G06F 1/3209* (2013.01); *G06F 1/3287* (2013.01); *G06F 21/31* (2013.01);
(Continued)

(58) Field of Classification Search
CPC .. G06F 1/3206; G06F 1/3209; G06F 11/3003; G06F 15/173; G06F 1/3287;
(Continued)

(56) References Cited

U.S. PATENT DOCUMENTS

2007/0078959 A1 4/2007 Ye
2009/0210519 A1 8/2009 Zill et al.
(Continued)

FOREIGN PATENT DOCUMENTS

WO WO-2016203131 A1 * 12/2016 ......... H04L 63/0272

OTHER PUBLICATIONS

International Search Report for International Application No. PCT/FR2021/052192 dated Apr. 7, 2022.

*Primary Examiner* — Thomas J. Cleary
(74) *Attorney, Agent, or Firm* — Knobbe, Martens, Olson & Bear, LLP

(57) ABSTRACT

A method to process a request for activation of a service operated by a local communication network managed by a gateway to access a remote communication network. The method is implemented by the gateway and includes: receiving a service activation request from a user terminal connected to the gateway, the request including at least one user identifier; obtaining, from a service identifier, at least one identifier of a resource of the local network to be invoked in order to execute the service; and checking an activation state
(Continued)

of the at least one resource, and when the at least one resource is in a standby state, transmitting a wake-up message to the at least one resource.

12 Claims, 10 Drawing Sheets

(51) Int. Cl.
*G06F 21/31* (2013.01)
*H04L 9/40* (2022.01)
*H04L 12/66* (2006.01)
*G06F 21/62* (2013.01)
*H04W 12/06* (2021.01)
*H04W 12/08* (2021.01)

(52) U.S. Cl.
CPC .............. *H04L 12/66* (2013.01); *H04L 63/08* (2013.01); *H04L 63/10* (2013.01); *G06F 21/6218* (2013.01); *H04W 12/06* (2013.01); *H04W 12/08* (2013.01)

(58) Field of Classification Search
CPC ..... G06F 21/31; G06F 21/6218; H04L 12/66; H04L 47/741; H04L 47/745; H04L 12/12; H04L 63/08; H04L 63/10; H04L 67/56; H04W 12/06; H04W 12/08
See application file for complete search history.

(56) References Cited

U.S. PATENT DOCUMENTS

2015/0113099 A1 4/2015 Masera et al.
2016/0007288 A1* 1/2016 Samardzija ....... H04W 52/0229 370/311
2017/0012795 A1* 1/2017 Chen .................... G05B 19/042
2017/0257226 A1* 9/2017 Bi ........................ H04L 43/0817
2019/0075149 A1* 3/2019 Lu ........................... H04L 65/70
2020/0366585 A1* 11/2020 Nainar ................ H04L 43/0811
2022/0103008 A1* 3/2022 Torres Carino ....... H02J 7/0068
2023/0396693 A1* 12/2023 Mallepalli ............. H04L 61/103
2023/0418354 A1* 12/2023 Dussaume .............. H04L 67/56
2024/0015039 A1* 1/2024 Dussaume ............ H04W 12/06
2024/0048949 A1* 2/2024 Huang .................... H04L 43/10

* cited by examiner

METHOD FOR ACTIVATING A SERVICE OPERATED IN A LOCAL COMMUNICATION NETWORK, METHOD FOR PROCESSING A REQUEST TO WAKE UP AN ITEM OF EQUIPMENT CONNECTED TO THE LOCAL NETWORK AND CONFIGURED TO IMPLEMENT SAID SERVICE, METHOD FOR REQUESTING ACTIVATION OF A SERVICE, CORRESPONDING DEVICES, GATEWAY, EQUIPMENT, USER TERMINAL, SYSTEM AND COMPUTER PROGRAMS

CROSS-REFERENCE TO RELATED APPLICATIONS

This application is filed under 35 U.S.C. § 371 as the U.S. National Phase of Application No. PCT/FR2021/052192 entitled "METHOD FOR ACTIVATING A SERVICE OPERATED IN A LOCAL COMMUNICATION NETWORK, METHOD FOR PROCESSING A REQUEST TO WAKE-UP AN ITEM OF EQUIPMENT CONNECTED TO THE LOCAL NETWORK AND CONFIGURED TO IMPLEMENT SAID SERVICE, METHOD FOR REQUESTING ACTIVATION OF A SERVICE, CORRESPONDING DEVICES, GATEWAY, EQUIPMENT, USER TERMINAL, SYSTEM AND COMPUTER PROGRAMS" and filed Dec. 2, 2021, and which claims priority to FR 2012732 filed Dec. 4, 2020, each of which is incorporated by reference in its entirety.

BACKGROUND

Field

The field of the development is that of a home or office local communication network, to which electronic equipment that is configured to go into a standby state when not in use is connected.

The development relates in particular to waking up such equipment when it is needed to execute a service requested by a user terminal.

Prior Art

While the Internet of Things tends to impact all aspects of daily and professional life, citizens are increasingly concerned about the future of the planet. This concern leads them to reduce the waste of energy resources.

In the connected home or office, energy consumption can be reduced by stopping or placing in a standby state equipment that is not in use, or at least some of its components, applications or interfaces. This is the case, for example, when the inhabitants of a house are away on holiday. Today, a group of items of equipment can be remotely stopped and restarted using a common power socket with a 3G/4G control interface.

However, it is still difficult to achieve flexible management and use of this equipment by this means. In any case, this management cannot be automated.

In order to allow equipment to remain in a standby state but to be woken up at any time, either at the request of a user or automatically, it is also known, on Ethernet networks, to send a wake-up packet to the IP address of the gateway that manages the local communication network, this packet mentioning the MAC address of the item of equipment to be woken up.

However, some services operated in a local communication network are composed of service elements provided by separate items of equipment. For example, at the application level, a presence simulation service in a house can be based on the broadcasting by a voice assistant of a sound file randomly chosen from the files stored in a NAS external storage space. The combination of these service elements is managed by such a service orchestrator.

A problem occurs when a user requests remote access to such a service while one or more items of equipment that provide elements of that service in the local network are in a standby state. Indeed, the service orchestrator is not necessarily aware of it.

It is understood that it is complicated for the user to identify remotely the items of equipment to be woken up and send wake-up packets to the gateway for each of them.

The development improves the situation.

SUMMARY

The development responds to this need by proposing a method for processing a request for activation of a service operated by at least one item of equipment connected to a local communication network managed by a gateway to access a remote communication network.

Said method is implemented by the gateway and comprises:

- receiving a service activation request from a user terminal connected to said gateway, said request comprising at least one user identifier;
- obtaining, from a service identifier, at least one identifier of a resource of the local network to be invoked in order to execute the service and checking an activation state of said at least one resource; and
- when said at least one resource is in a standby state, transmitting a wake-up message to said at least one resource.

The development proposes a completely new and inventive approach to solve the problem of accessing a service offered by a local communication network where at least one part of the resources or items of equipment is in a standby state. It consists in orchestrating at the gateway the management of remote access to this service by a user with that of activation of the resources needed to execute this service in the local communication network.

The user terminal can be connected to the gateway via the remote communication network or the local communication network.

Thus, the user only needs to transmit an application request to access the service in order to trigger at this gateway a verification of their access rights and a verification of the availability of the local network resources invoked during the execution of the requested service. If one of these resources is presumed or known to be in a standby state, the gateway sends it a wake-up message.

In this way, remote activation of a service implemented by the local network is made easier for the user who does not need to know about the resources needed to execute the service, nor to wake them up individually.

In addition, since the user no longer needs to send any network request to wake up the network resources in question in addition to the application request to access the service, they no longer need to know about the local network resources that implement the service. This reduces the risk of technical information leakage and thus increases the security of the local network.

According to an aspect of the development, the method comprises verifying a user's authorisation to activate said at least one service of said network from access rights stored in memory in association with said user identifier.

One advantage is that the resource wake-up operation is only triggered when the user is authorised to access the requested service.

According to another aspect of the development, when said at least one resource is an item of equipment of said local network, separate from the gateway, configured to manage said service, the method comprises, following the waking up of the item of equipment, receiving connection information of the user terminal to said item of equipment and transmitting said information to the user terminal of said connection information.

Once woken up, the item of equipment connects to the gateway and transmits to it the information needed for the user to connect. Upon receipt of this connection information, the user terminal can connect to the item of equipment and access the requested service. Advantageously, it accesses a portal of services orchestrated by the item of equipment itself.

According to yet another aspect of the development, when several resource identifiers are associated with the service identifier, the method further comprises obtaining a service configuration script defining a time sequence of actions to be performed by said resources and, following the waking up of said resources and their connection to the gateway, ordering said resources to perform the actions in accordance with said script.

One advantage is that the gateway orchestrates from end to end the implementation of the service requested by the user.

According to yet another aspect of the development, the method comprises transmitting to the user terminal a request to select a service identifier from a plurality of service identifiers provided by the local network and authorised by the access rights associated with the user identifier.

For example, the gateway comprises a service portal, that is a human/machine interface that allows the user to choose easily the service they want to access. One advantage is that the user does not need to provide the identifier of the service they want to access in their request to the gateway.

The development also relates to a computer program product comprising program code instructions for implementing a processing method according to the development, as described previously, when it is executed by a processor.

The development also relates to a computer-readable storage medium on which the computer programs as described above are recorded.

Such a storage medium can be any entity or device able to store the program. For example, the medium can comprise a storage means, such as a ROM, for example a CD-ROM or a microelectronic circuit ROM, or a magnetic recording means, for example a USB flash drive or a hard drive.

On the other hand, such a storage medium can be a transmissible medium such as an electrical or optical signal, that can be carried via an electrical or optical cable, by radio or by other means, so that the computer program contained therein can be executed remotely. The program according to the development can be streamed in particular on a network, for example the Internet network.

Alternatively, the storage medium can be an integrated circuit in which the program is embedded, the circuit being adapted to execute or to be used in the execution of the above-mentioned processing method.

The development also relates to a device for processing a request for activation of a service operated by a local communication network managed by a gateway to access a remote communication network.

Said device is configured to implement at the gateway:

receiving a service activation request from a user terminal connected to said gateway via the remote communication network, said request comprising at least one user identifier;

verifying a user's authorisation to activate said at least one service of said network from access rights stored in memory in association with said user identifier, obtaining, from a service identifier, at least one identifier of a resource of the local network to be invoked in order to execute the service; and checking an activation state of said at least one resource and, when said at least one resource is in an inactive state, transmitting a wake-up message to said at least one resource.

Advantageously, said device is configured to implement the above-mentioned processing method, according to its different embodiments.

Advantageously, said device is integrated into a gateway to access a remote communication network, configured to manage a local communication network.

The above-mentioned corresponding gateway, processing device and computer program have at least the same advantages as those provided by the above-mentioned processing method according to the different embodiments of the present development.

Correlatively, the development also relates to a method for processing a wake-up request from a gateway to access a remote network, said gateway being configured to manage a local network.

Said method is implemented by an item of equipment connected to said network and comprises:

upon receipt of a wake-up message from the gateway, activating at least one human/machine interface for managing services operated by said item of equipment;

upon receipt of a wake-up message from the gateway, activating (41) at least one human/machine interface for managing services operated by said item of equipment;

receiving a command from the gateway for at least one action to activate a service requested by a user terminal; and performing said at least one action.

According to the development, the gateway orchestrates the execution of the service. On instructions from the gateway, the equipment wakes up and performs the actions ordered by the latter.

According to an aspect of the development, when the ordered action is to activate for the user a service implemented by said item of equipment, performing said at least one action comprises:

transmitting connection information to said interface to the gateway;

upon receipt of a connection request on said interface from a user terminal connected to said gateway:

verifying that the user is authorised to access said at least one service from access rights stored in memory in association with said user identifier, obtaining, from a service identifier, at least one identifier of a resource of the local network to be invoked in order to execute the service, and checking an activation state of said at least one resource and, when said at least one resource is in an inactive state, transmitting a wake-up message to said at least one resource.

In turn, the item of equipment of the local network, once woken up by the gateway, can orchestrate the execution of the service requested by the user terminal and to do so induce the wake-up of other resources of the network. It then orders the execution of the requested service, orchestrating the actions of the various resources involved within the item of equipment itself or in the local network. According to this embodiment of the development, the orchestrator of the item of equipment is therefore invoked in cascade of the gateway's.

The development also relates to a computer program product comprising program code instructions for implementing a method for processing a wake-up request according to the development, as described previously, when it is executed by a processor.

The development also relates to a computer-readable storage medium on which the computer programs as described above are recorded.

Such a storage medium can be any entity or device able to store the program. For example, the medium can comprise a storage means, such as a ROM, for example a CD-ROM or a microelectronic circuit ROM, or a magnetic recording means, for example a USB flash drive or a hard drive.

On the other hand, such a storage medium can be a transmissible medium such as an electrical or optical signal, that can be carried via an electrical or optical cable, by radio or by other means, so that the computer program contained therein can be executed remotely. The program according to the development can be streamed in particular on a network, for example the Internet network.

Alternatively, the storage medium can be an integrated circuit in which the program is embedded, the circuit being adapted to execute or to be used in the execution of the above-mentioned processing method.

The development also relates to a device for processing a wake-up request from a gateway to access a remote network, said gateway being configured to manage a local network. Said device is configured to implement at an item of equipment connected to said local network: upon receipt of a wake-up message from the gateway, activating at least one human/machine interface for managing services operated by said item of equipment; receiving a command from the gateway for at least one action to be performed in order to activate a service requested by a user terminal; and performing said at least one action.

Advantageously, said device is configured to implement the above-mentioned processing method, according to its different embodiments.

Advantageously, said device is integrated into an item of equipment of the local communication network.

The above-mentioned corresponding item of equipment, processing device and computer program have at least the same advantages as those provided by the above-mentioned processing method according to the different embodiments of the present development.

Correlatively, the development also relates to a method for requesting activation of a service operated by a local communication network managed by a gateway to access a remote communication network.

Said method is implemented by a user terminal connected to the gateway and comprises:

transmitting the service activation request to the gateway; and receiving a confirmation of execution of the service.

According to an aspect of the development, it further comprises receiving connection information to an item of equipment connected to the local network and configured to implement the service, transmitting a connection request to said item of equipment comprising said connection information, and confirmation of execution of the service is received from said equipment.

One advantage is that the user does not need to know which item(s) of equipment is/are implementing the service. The gateway acts as an intermediary and orchestrator of the service requested by the user.

According to another aspect of the development, the method comprises a selection of a service from a plurality of services authorised for said user terminal.

One advantage is that the human/machine interface installed on the user terminal stores the services implemented by the local network and authorised for the user and offers them to the user. Access to these services is therefore made easier for this user.

The development also relates to a computer program product comprising program code instructions for implementing a method for requesting activation of a service according to the development, as described previously, when it is executed by a processor.

The development also relates to a computer-readable storage medium on which the computer programs as described above are recorded.

Such a storage medium can be any entity or device able to store the program. For example, the medium can comprise a storage means, such as a ROM, for example a CD-ROM or a microelectronic circuit ROM, or a magnetic recording means, for example a USB flash drive or a hard drive.

On the other hand, such a storage medium can be a transmissible medium such as an electrical or optical signal, that can be carried via an electrical or optical cable, by radio or by other means, so that the computer program contained therein can be executed remotely. The program according to the development can be streamed in particular on a network, for example the Internet network.

Alternatively, the storage medium can be an integrated circuit in which the program is embedded, the circuit being adapted to execute or to be used in the execution of the above-mentioned activation request method.

The development also relates to a device for requesting activation of a service operated by a local communication network managed by a gateway to access a remote communication network.

Said device is configured to implement at the user terminal:

transmitting the service activation request to the gateway; and receiving a confirmation of execution of the service.

Advantageously, said device is configured to implement the above-mentioned activation request method, according to its different embodiments.

Advantageously, said device is integrated into a user terminal.

The above-mentioned corresponding user terminal, activation request device and computer program have at least the same advantages as those provided by the above-mentioned method for requesting activation of a service according to the different embodiments of the present development.

Finally, the development relates to a system for managing a request for activation of a service provided by a local communication network received from a user terminal connected to said gateway. Such a system comprises the above-mentioned gateway, user terminal and item of equipment.

BRIEF DESCRIPTION OF THE DRAWINGS

Other purposes, features and advantages of the development will become more apparent upon reading the following description, hereby given to serve as an illustrative and non-restrictive example, in relation to the figures, among which.

DETAILED DESCRIPTION OF CERTAIN EMBODIMENTS

The general principle of the development is based on the implementation, in a gateway to access a remote communication network and configured to manage a local communication network, of a combined management of access to a service operated within this local network and activation of the network resources to be invoked in order to execute this service. Upon receipt of a request to access a service from a user terminal connected to this gateway, the development proposes to verify that this terminal is authorised to access it, to obtain the identifiers of the resources or equipment of the local network to be invoked for the implementation of this service as well as their activation state, and, if they are in an inactive state, to transmit to them a wake-up message.

This development has many applications in both everyday and professional life, for any type of user terminal, such as a smartphone, a tablet, a laptop, etc., that is connected to a telecommunication network WAN (Wide Access Network) and wants to remotely access services of a local communication network LAN (Local Access Network) in its personal or professional environment, when this network is in a standby state.

It is particularly interesting when the user terminal is connected to the gateway via the remote network.

In the remainder of the description, a service operated in the local communication network is defined in the broadest sense as one or more functions performed by one or more items of equipment connected to this network. Examples include remote access to a photo album stored in a network-attached storage server NAS connected to a user's home network. A service can also comprise a complex sequence of functions defined by a program or script, and require different resources or items of equipment to cooperate. For example, a presence simulation service involves several items of equipment of the local network, such as obtaining a sound file from a network-attached storage server NAS, transmitting it to a voice assistant and ordering it to play it.

Figure 1:
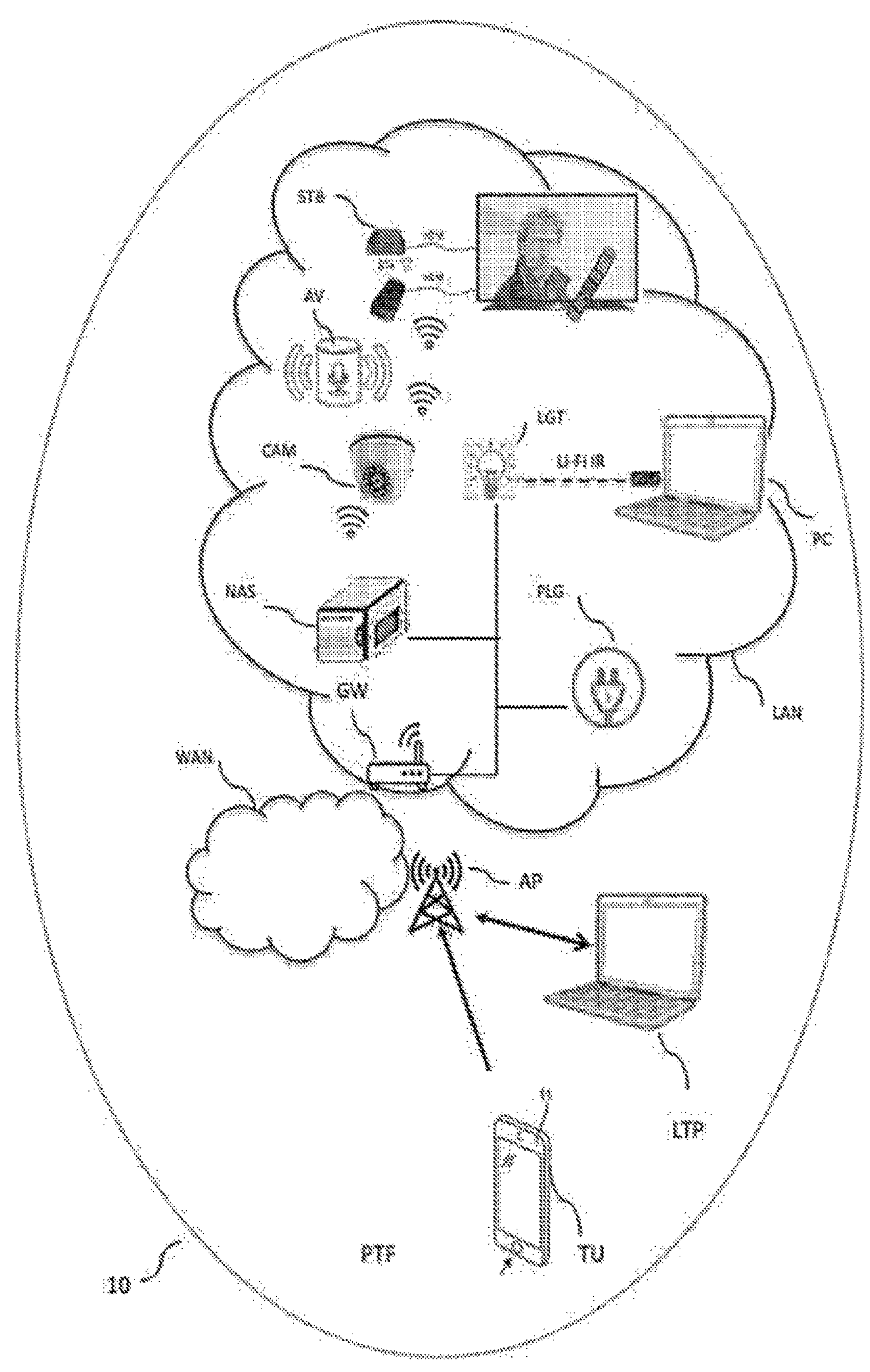
FIG. 1: shows an example of the architecture of a system for managing a request for activation of a service operated by a local communication network according to the development.

In relation to FIG. 1, an example of the architecture of a system 10 for activating a service operated in a communication network LAN in response to a service activation request received from a user terminal TU connected to a remote communication network WAN of an operator according to one embodiment of the development is now presented. The communication network LAN is managed by a gateway GW to access the remote network WAN provided by the operator to a user who has subscribed to that operator. In the example considered, the gateway is connected to the remote network WAN via an ADSL or fibre link. Of course, it can also connect to the operator's cellular network via a 2G to 5G link.

In this example, the network LAN is a home network, to which several items of equipment are connected, such as a CAM camera, a voice assistant AV, a network-attached storage server NAS, a set-top box STB, or even a connected plug PLG, an connected lamp LGT and a personal computer PC. These items of equipment are connected to the gateway GW. For example, the storage server NAS, the connected lamp LGT and the connected plug PLG are connected to the gateway GW via a wired link, for example Ethernet, USB or PLC over electrical wiring, the set-top box STB, the camera CAM and the voice assistant AV are connected via a wireless radio link, for example Wi-Fi, and the personal computer PC is connected through the connected lamp LTG via a Li-Fi optical wireless link. Naturally, other types of wireless links can be used such as Bluetooth, Bluetooth Low Energy, z-wave, zigbee, DECT-ULE, etc.

Terminals such as the smartphone TU or the laptop LTP of at least one user authorised to connect to the local network LAN but which are, in the example of FIG. 1, not in the house and connected to the remote network WAN, are also considered.

For example, it is assumed that the user is away from home and has gone to a holiday resort for several days. It is also assumed that the user who administers the gateway and the home local network LAN, who may or may not be the user, has placed at least one part of the items of equipment of that network in a standby state. For example, they have activated the "Extended Absence" use scenario on a service administration portal of their home gateway GW offered by their operator. For example, this portal is accessible from a mobile application installed on their telephone TU or a web application accessible from a web browser on their laptop LTP. The explicit switch to this use scenario induces for example:

- sending commands to cut off the power supply to the connected electrical outlets that serve the items of equipment considered as non-essential, either explicitly predefined or by default,
- sending standby commands (ad hoc Ethernet packet) to the items of equipment likely to be woken up during this period, either on demand or by fixed or semi-random programming (presence simulation), such as STB s, TV sets, connected lamps,
- saving in non-volatile memory on their gateway the network IDs, IP and MAC addresses of the items of equipment placed in a standby state,
- sending commands to activate equipment dedicated to presence detection and alarms such as a central alarm station (not shown) and some stand-alone cameras,
- stopping unnecessary and energy-consuming interfaces on the gateway, such as Wi-Fi or 4G/5G where applicable, and maintaining others, such as BLE and Ethernet,
- stopping unnecessary and energy-consuming applications on the home gateway,
- activating a program on the gateway that manages a presence simulation calendar with communication of its programming to the central alarm station, so that its light or suspicious noise detection system is not disturbed,
- activating a program on the gateway that manages a standby and wake-up calendar for certain interfaces of the gateway, such as its Wi-Fi interface (ad hoc Ethernet packet).

Switching some items of equipment to standby or monitoring mode (for example, the stand-alone camera) induces in these:

- maintaining the Bluetooth Low Energy (BLE) interfaces on the items of equipment that have some,
- maintaining the Ethernet interfaces on the items of equipment that have some,
- placing in a standby state or stopping the Wi-Fi interfaces of the items of that also have a Bluetooth Low Energy (BLE) or Ethernet interface,
- stopping some of their components and embedded applications,
- monitoring by them of wake-up messages on their BLE and Ethernet interfaces.

In the example of FIG. 1, it is therefore assumed that the user of the local network LAN wants to remotely access a service of this local network LAN, from their terminal TU connected to the remote network WAN, while the gateway GW that manages this network LAN and at least one part of the resources of this network are in a standby state. For example, they want to access the network LAN to view on their terminal TU a photo album stored in the storage server NAS or they want to activate a presence simulation service in their home.

Of course, the development is not limited to this example and also applies when the user terminal is connected to the gateway via the local network LAN.

As illustrated in FIG. 1, the system 10 according to the development comprises the gateway GW configured to manage the local network LAN and to route communications from the user terminals connected to the network LAN to the remote network WAN or vice versa. The system 10 also comprises equipment or resources of the local network LAN, that are for example the previously mentioned equipment such as the server NAS, the camera CAM, the set-top box STB, the voice AV, etc. Finally, it comprises the user terminal TU connected to the remote network WAN.

Figure 2A:
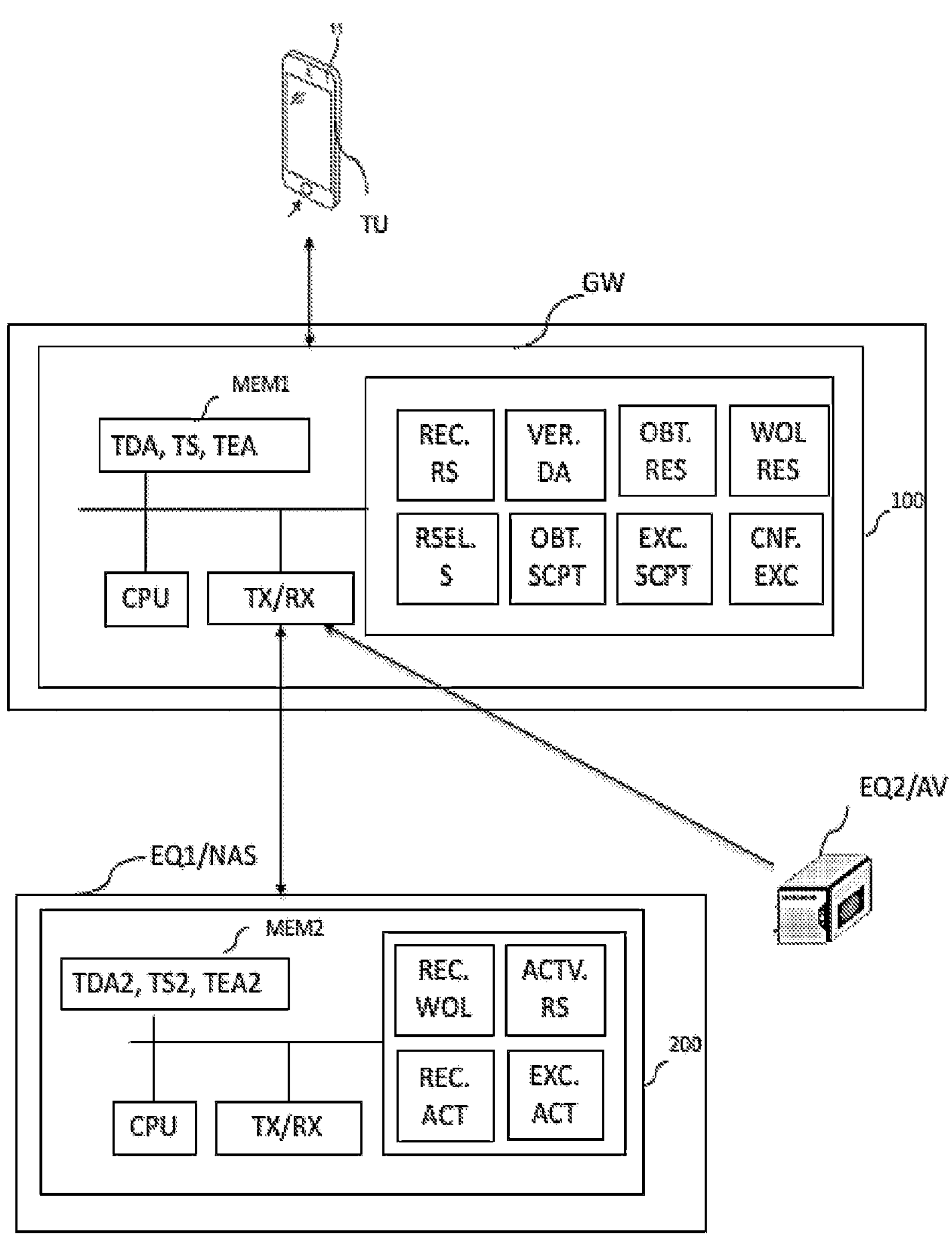
FIG. 2A and FIG. 2B: diagrammatically shows examples of the architectures of a gateway to access a remote network and configured to manage a local network, integrating a device for activating a service operated by said local network according to one embodiment of the development, of an item of equipment connected to the local network and configured to implement said service, integrating a device for processing a wake-up request, and of a user terminal connected to the gateway via the remote network, integrating a device for requesting access to said service according to two embodiments of the development.

FIG. 2A shows a first example of the architecture of the gateway GW according to one embodiment of the development. According to this first example, the gateway GW comprises a device 100 for activating a service provided by the local communication network it manages. This device is configured to receive a request for access to at least one service by a user terminal connected to said gateway via an interface with the remote communication network, said request comprising at least one user identifier, verify an authorisation of the user to said at least one service of said network from access rights stored in memory in association with said user identifier, obtaining, from a service identifier, at least one identifier of an item of equipment of the local network associated with said service identifier, said item of equipment being invoked for the execution of the service, verify an activation state of said item of equipment and, when said item of equipment is in an inactive state, transmit a wake-up message to it.

Alternatively, the device 100 may be independent of the gateway GW, but connected to it by any link whatsoever, wired or not.

In particular, the processing device 100 comprises a module REC. RS for receiving the service access request from the user terminal, a module VER. DA for verifying an authorisation or access rights of the user, a module OBT. EQ for obtaining at least one item of equipment to be invoked for the execution of the service and an activation state of this item of equipment and a module TRNS WOL for transmitting to the item of equipment EQ a wake-up message configured to transmit a wake-up message to it when it is in an inactive state.

Advantageously, the device 100 also comprises a module RSEL. S for requesting the selection of a service to the user terminal, a module OBT. SCPT for obtaining a service configuration script and a module EXC. SCPT for ordering the execution of the service according to the obtained script. Advantageously, commands to execute tasks described in the script are transmitted to the item of equipment EQ. As illustrated in FIG. 2A, several items of equipment AV, NAS can be woken up and then invoked for the execution of the service. For example, to execute a presence simulation service, the device 100 wakes up the NAS to activate a sound file lookup service as well as the voice assistant to order it to retrieve a sound file from the NAS and then play it. Once the equipment AV, NAS is woken up, the orchestration by the device 100 is performed at the application level, by line commands, to obtain from the NAS access to its files with, for example, filtering by name and type and to ask the voice assistant AV to play/broadcast a sound file.

Advantageously, the device 100 finally comprises a module TX/RX for receiving and transmitting information via an interface with the remote network WAN and another interface with the local communication network LAN. Alternatively, it uses the transmission/reception module of the gateway GW into which it is integrated.

The non-volatile memory MEM1 advantageously comprises a table TDA associating access rights to the local network LAN services with a user identifier, a table TS associating the identifiers of the resources to be invoked in order to execute the service with a service identifier and a table TEA associating an activation state with a resource identifier. Alternatively, the tables TS and TEA can be grouped into one.

Figure 3:
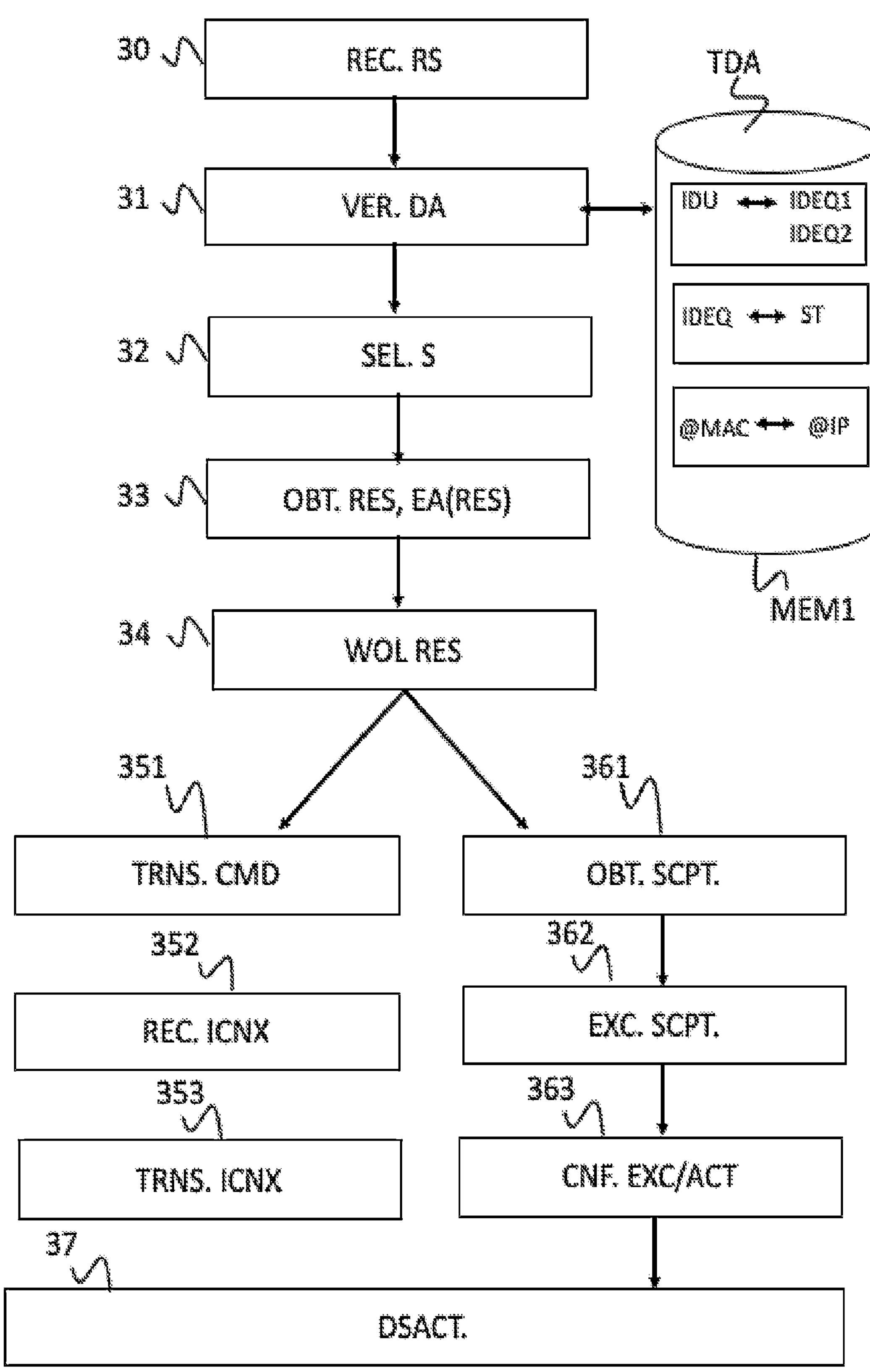
FIG. 3: describes in the form of a flowchart the steps of a method for activating a service operated by a local communication network according to one embodiment of the development.

The device 100 thus implements the method for activating a service operated in a local network according to the development that will be detailed hereafter in relation to FIG. 3.

Finally, FIG. 2A shows a first example of the architecture of a user terminal TU according to one embodiment of the development. According to this first one, the user terminal TU comprises a device 300 for requesting activation of a service operated in the local network LAN, configured to transmit to the gateway GW a request to access this service, receive connection information to an item of equipment of the local network from the gateway, said item of equipment being configured to execute the requested service.

Alternatively, the device 300 may be independent of the user terminal TU, but connected to it by any link whatsoever, wired or not.

In particular, the access request device 300 comprises a module TRNS RS for transmitting a service activation request to the gateway GW and a module for receiving a confirmation of execution of the requested service from the gateway.

Advantageously, the device 300 also comprises a module SEL. S for selecting a service from a plurality of services authorised by the gateway for the user terminal.

Advantageously, the device 300 finally comprises a module TX/RX for receiving and transmitting information via an interface with the remote network WAN and another interface with the local communication network LAN. Alternatively, it uses the transmission/reception module of the user terminal TU into which it is integrated.

Figure 5:
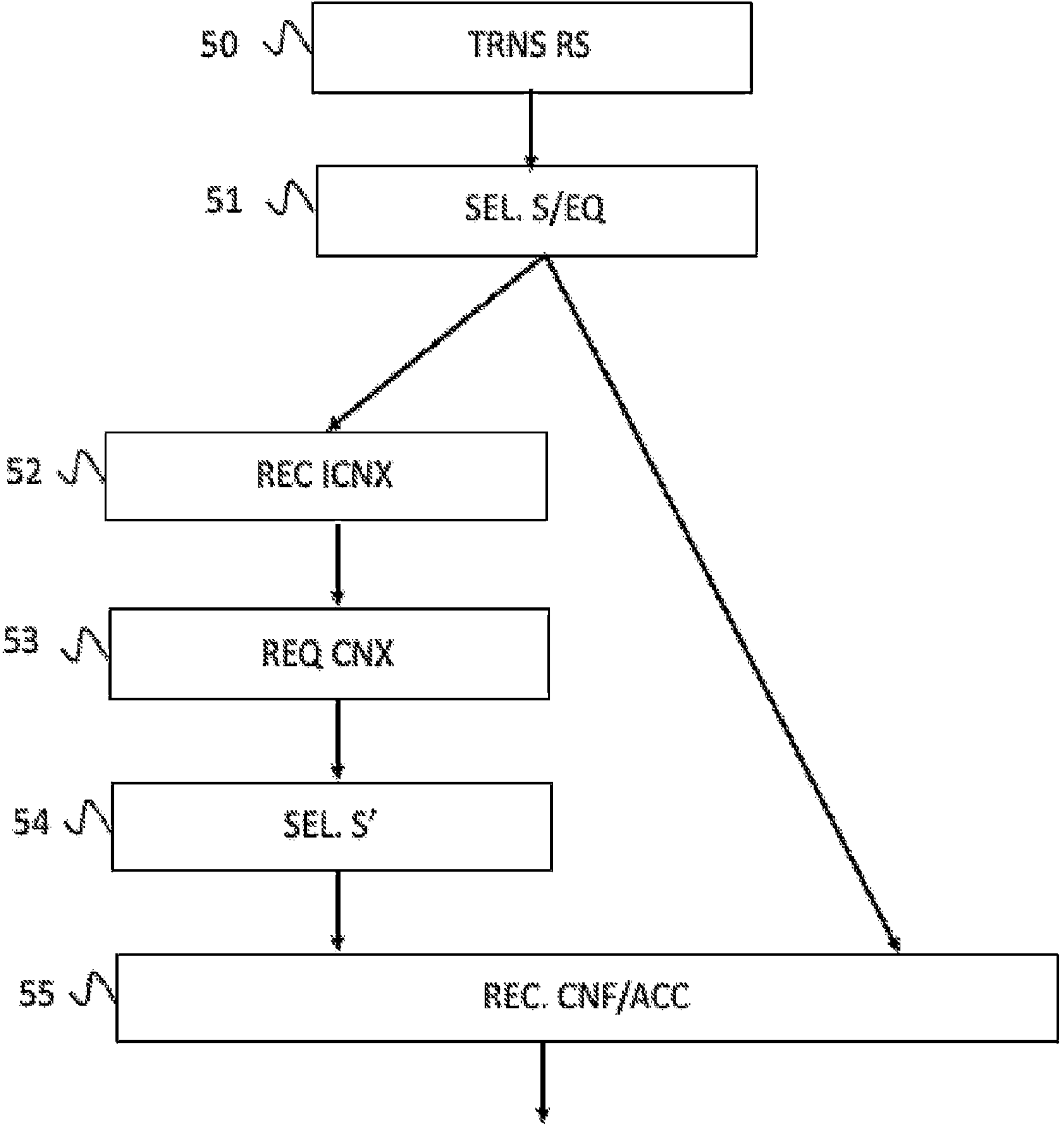
FIG. 5: describes in the form of a flowchart the steps of a method for requesting activation of a service operated by a local communication network according to one embodiment of the development.

The device 300 thus implements the method for requesting remote activation of a service according to the development that will be detailed hereafter in relation to FIG. 5.

Figure 2B:
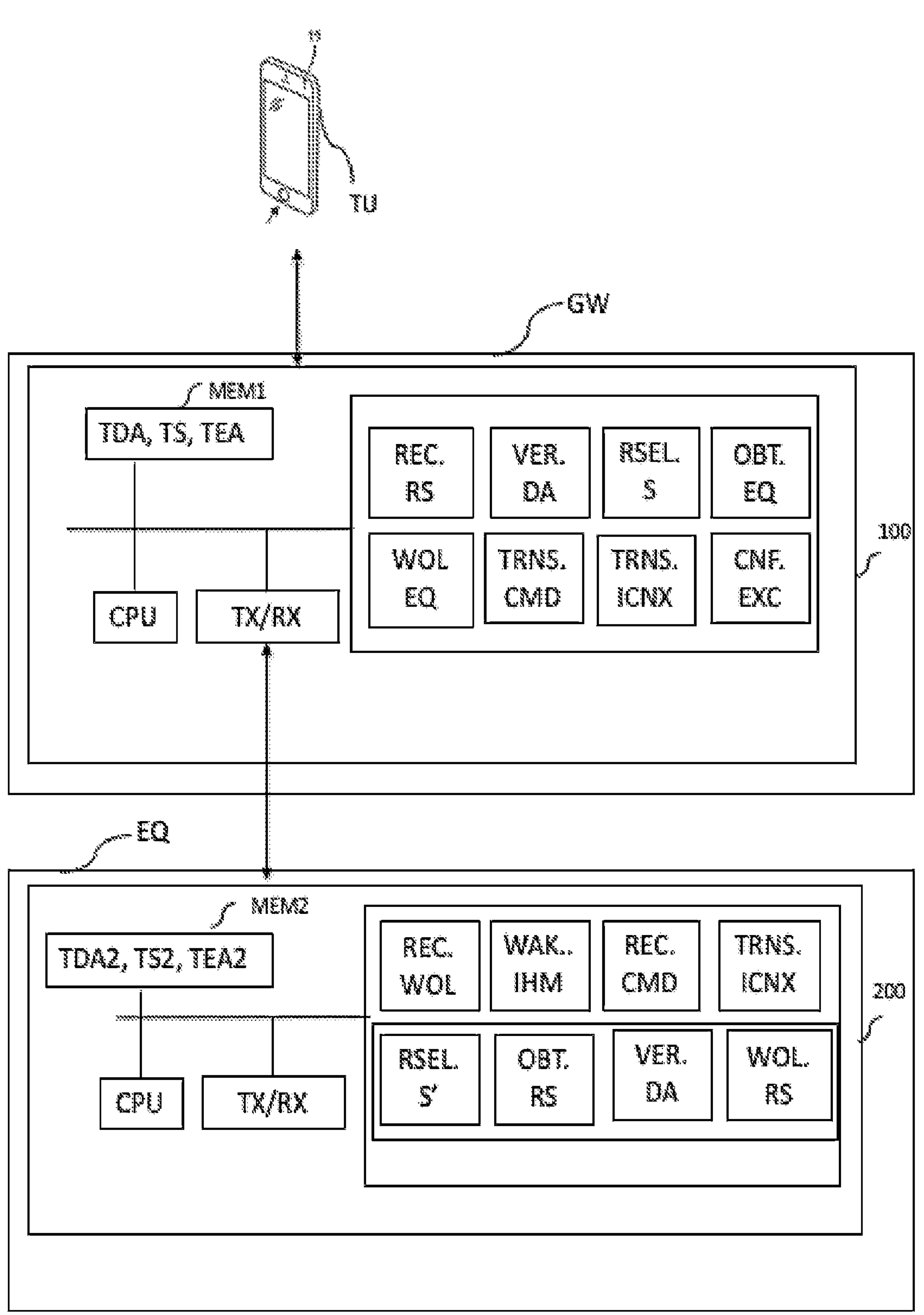

FIG. 2B also shows a second example of the architecture of the gateway GW according to another embodiment of the development. According to this second example, the device 100 for activating a service provided by a local communication network managed by the access gateway comprises the module REC. RS for receiving the service access request from the user terminal, the module VER. DA for verifying an authorisation or access rights of the user, the module OBT. EQ for obtaining at least one item of equipment to be invoked for the execution of the service and an activation state of this item of equipment and the module TRNS WOL for transmitting to the item of equipment EQ a wake-up message configured to transmit to it a wake-up message when it is in an inactive state.

Advantageously, the device 100 also comprises a module RSEL. S for requesting the selection of a service to the user terminal, a module TRNS. CMD for transmitting a command for at least one action to activate the service requested by the client, and a module TRNS. ICNX for transmitting to the user terminal connection information to the item of equipment. Thus, to access the service, the user terminal TU connects directly to the item of equipment EQ.

FIG. 2B also shows an example of the architecture of the item of equipment EQ implementing the service requested by the user terminal TU. According to this embodiment of the development, the item of equipment EQ comprises a device 200 for processing a wake-up request received from the gateway GW according to the development, configured to receive REC. WOL a wake-up message from the gateway, wake up WAK. HMI at least one human/machine interface for managing the services offered by the item of equipment.

Advantageously, the device 200 comprises a module REC. CMD for receiving a command for at least one action to activate the service requested by the client and a module for executing the at least one action. This module advantageously comprises a module TRNS. ICNX for transmitting connection information to the gateway, a module CNX for processing a connection request to said interface received from the user terminal. It also comprises a module VER. DA for verifying that the user is authorised to access said at least one service from access rights stored in memory in association with said user identifier, a module OBT. RS for obtaining from a service identifier at least one resource of the local network to be invoked in order to execute the service and an activation state of said at least one resource and, when said at least one resource is in an inactive state, a module for transmitting a wake-up message to said at least one resource. In other words, according to this embodiment of the development, the item of equipment EQ also combines the functions of orchestrating a service and activating the resources involved in the implementation of this service.

Alternatively, the device 200 may be independent of the item of equipment, but connected to it by any link whatsoever, wired or not.

Advantageously, the device 200 finally comprises a module TX/RX for receiving and transmitting information in the network LAN. Alternatively, it uses the transmission/reception module of the item of equipment EQ into which it is integrated.

The non-volatile memory MEM2 advantageously comprises a table TDA2 associating access rights to the services managed by the item of equipment with a user identifier and a table T@ associating resources invoked for the execution of the service with a service identifier. Finally, it comprises a table TEA2 associating an activation state with the resources.

Figure 4A:
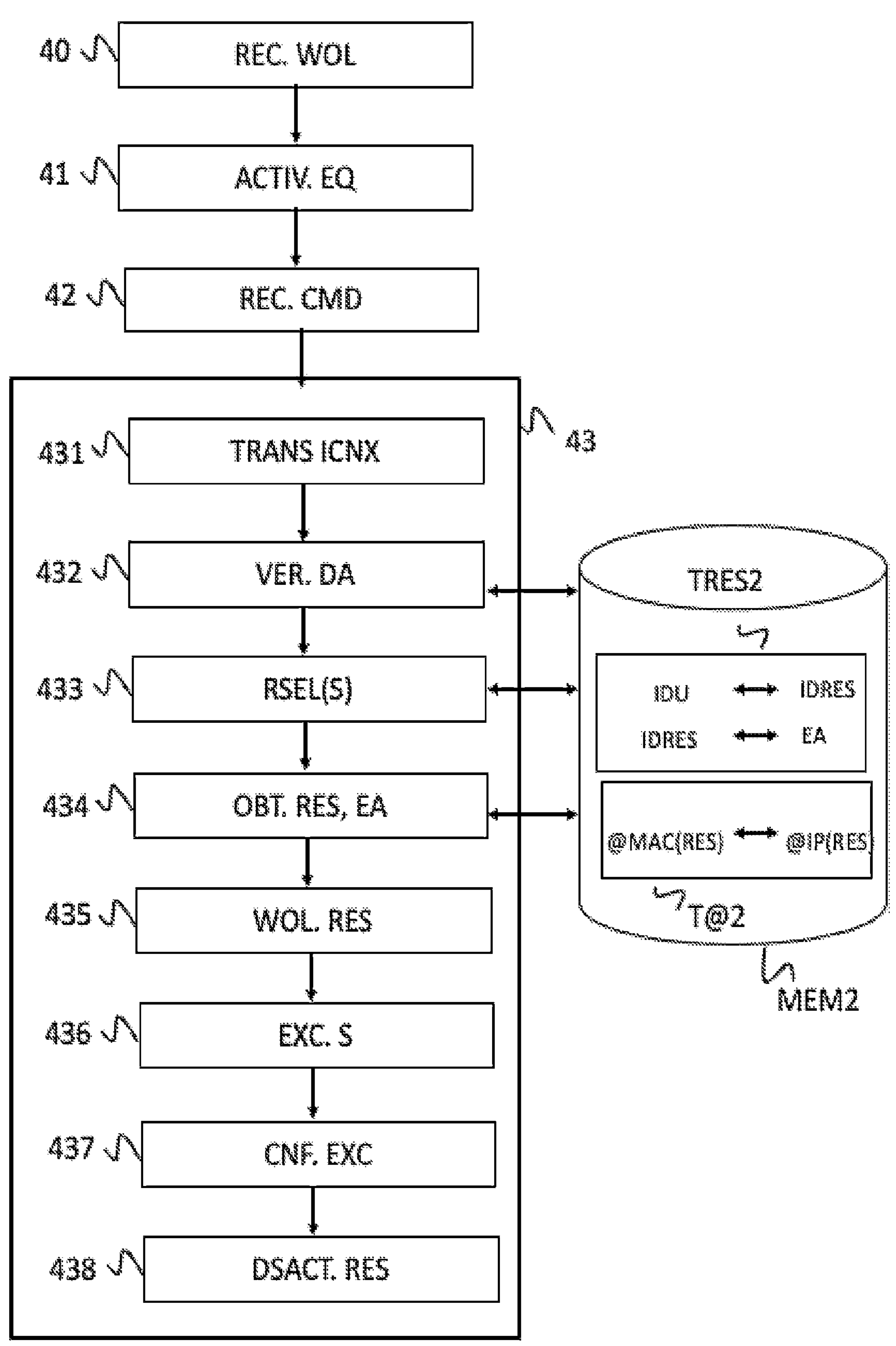
FIG. 4A and FIG. 4B: describe in the form of a flowchart the steps of a method for processing a request for activation of a service implemented by an item of equipment connected to the local communication network, according to two embodiments of the development.
Figure 4B:
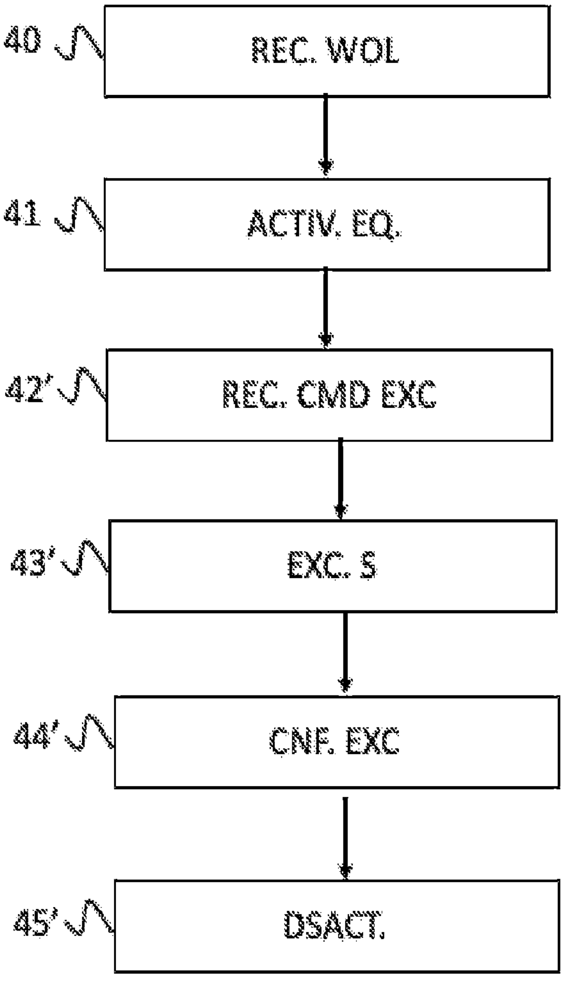

The device 200 thus implements the method for processing a wake-up request according to the development that will be detailed hereafter in relation to FIGS. 4A and 4B.

Finally, FIG. 2B shows a second example of the architecture of a user terminal TU according to this other embodiment of the development. According to this second example, the device 300 is configured to transmit to the gateway GW a request to access this service, to receive from the gateway connection information to an item of equipment of the local network, said item of equipment being configured to execute the requested service, to connect to the item of equipment using the received information and to receive from the item of equipment a confirmation of execution of the service.

Alternatively, the device 300 may be independent of the user terminal TU, but connected to it by any link whatsoever, wired or not.

In particular, the access request device 300 comprises a module for transmitting a service activation request to the gateway GW, a module for receiving connection information to an item of equipment of the local network, configured to execute the requested service, from the gateway, a module for connecting to said item of equipment and a module for receiving a confirmation of execution of the service from said item of equipment.

Advantageously, the device 300 also comprises a module for selecting a service from a plurality of services authorised by the gateway for the user terminal.

Advantageously, the device 300 finally comprises a module for receiving and transmitting information via an interface with the remote network WAN and another interface with the local communication network LAN. Alternatively, it uses the transmission/reception module of the user terminal TU into which it is integrated.

The device 300 thus implements the method for requesting remote activation of a service according to the development that will be detailed hereafter in relation to FIG. 5.

In relation to FIG. 3, an embodiment of the method for processing a request for activation of a service provided by a local communication network managed by a gateway to access a remote communication network according to the development is now presented in the form of a flowchart.

checking an activation state of said at least one resource and, when said at least one resource is in an inactive state, transmitting a wake-up message to said at least one resource.

In a step 30, the gateway GW, connected to the remote network WAN, receives the request RS for activation of a service operated by the local network LAN from the user terminal TU. Since the user terminal is connected to the remote network WAN, this request RS is received via an interface of the gateway with the remote network WAN.

The request RS comprises at least one identifier IDU of the user of the terminal TU. Optionally, it also comprises an identifier of the requested service. It is assumed here that the user terminal has previously connected to the gateway GW. For example, the user subscribed to a service for managing remote access to the local communication network managed by their home gateway, offered by the remote network operator. They access this service via a software application installed on their terminal or a web application or even a web page, whose human/machine interface allows them to submit their requests to access a local network and then to activate a service provided by this network. It is understood that the quantity of information contained in this request for activation of a service RS depends in particular on a level of intelligence of the human/machine interface and on the information relating to the services provided by the local network and the user's access rights available to it. At a minimum, it has the IP address of a human/machine interface for managing the services, or service portal, implemented by the gateway GW. Advantageously, if its interface is more advanced, it can propose to the user to choose a service from a plurality of services operated by the local network it manages. It is recalled that the term service refers here in the broadest sense to any functionality made available to a user by one or more resources/items of equipment in a local communication network. Examples include the Wi-Fi interface of the gateway or a presence simulation service that involves several resources of the local network (camera, NAS storage server, Wi-Fi interface, etc.). Some embodiments will be detailed hereafter in relation to FIGS. 6 and 7.

In 31, the device 100 obtains information DA relating to the user's access rights, for example associated in a memory MEM1 with the user identifier IDU contained in their request RS, and verifies that the user is authorised to access the services offered by the gateway GW. For example, it queries a database TDA1 based on the identifier IDU and obtains in return one or more identifiers, also called labels, of services that the user is authorised to activate.

Optionally, in 32, if the access request does not comprise a service identifier and if several authorised service identifiers are associated with the user identifier IDU in the table TA2, then a service selection request RSEL(S) is transmitted to the user terminal, comprising the identifiers of the authorised local networks LAN. It is assumed that the device 100 receives a response from the user terminal TU, comprising a service identifier IDS.

In 33, the device 100 obtains, from a service identifier, at least one identifier of at least one resource of the local network associated with said service identifier, said resource being invoked for the execution of the service. For example, it checks a table TS1 stored in memory and associates the identifiers of these resources with the identifier of the requested service.

A resource refers here in the broadest sense to a hardware or software component of the gateway or of any other item of user equipment connected to the local network managed by the gateway. This resource can therefore be internal or external to the gateway. It consists for example in an interface for the gateway to communicate with the local network, such as its Wi-Fi interface, or a separate item of equipment, such as the network-attached storage server NAS or the voice assistant AC. For example, for the presence simulation service, the resources associated with the identifier of this service IDS are the network-attached storage server NAS and the voice assistant AV. However, when reading a file on a USB flash drive connected to the gateway, reading an internal log file or activating a 4G or 5G radio WAN interface, the resources to be requested are internal to the gateway.

Advantageously, the device 100 also obtains an activation state EA of each of the resources involved in the implementation of the requested service, for example from a table TEA1 associating with the resource identifier IDRS its activation state EA. For example, this state can be set to "active" or "inactive".

In 34, the device 100 sends a wake-up message to each resource identified as being in an inactive state. For a resource external to the gateway GW, for example an item of equipment EQ, connected via Ethernet or whose Wi-Fi interface has remained active, the device 100 obtains the IP address of this item of equipment in a routing table it has maintained while the local network was in a standby state, this IP address being associated with a network identifier such as the MAC address of the item of equipment. It transmits to this IP address a "Wake on Lan" message, known to those skilled in the art. To wake up an internal resource, the gateway sends a "function call" request via an internal API (Application Programming Interface).

This wake-up message is, for example, a network message that is initiated at the application level. It can comprise a simple ON/OFF command. In this case, once woken up, the item of equipment EQ takes the initiative to connect to the gateway and, depending on its configuration, it can either execute a sequence of predefined actions or put itself in the situation of receiving line command application messages from the gateway GW ordering it to execute a particular sequence of actions. Where appropriate, the application messages in question comprise the ad-hoc credentials. They can also comprise a session identifier. This identifier will be recorded in the connection logs and can then be used to manage concurrent access and avoid possible invocation loops.

At this stage, two options are considered. According to a first option, the requested service S is managed by an item of equipment EQ in the local network, separate from the gateway, for example the network-attached storage server NAS. In this case, the device 100, after waking up the item of equipment EQ, transmits to it in 351 a command to activate the service. In return, it obtains from it in 352 connection information ICNX, which it transmits in 353 to the user terminal TU. For example, the NAS may require the provision of a user or administrator ID/password pair to execute certain services.

According to a second option, the device 100 orchestrates itself the service S requested by the client. Once it has woken up all the resources RES to be invoked for the execution of this service, it obtains in 361 a script defining a sequence of actions to be ordered for the execution of this service and it executes in 362 this script by ordering each resource RES the action or service element to be executed according to the sequence and configuration defined in the script. In 363, it confirms to the terminal that the service has been activated or transmits an execution report to it.

In 37, once the execution of the service is fully completed, it deactivates the resources by sending them a deactivation message if necessary. This message can, for example, take the form of a disconnection command, that will be followed by a timer-based placement in a standby state of the item of the equipment, or a stop command.

In relation to FIG. 4A, an embodiment of the method for processing a request for activation of a service provided by an item of equipment EQ of the local communication network LAN managed by the gateway GW according to one embodiment of the development is now presented in the form of a flowchart.

In 40, the device 200 receives a wake-up message WOL from the gateway GW on a communication interface of the local communication network LAN. For example, the message is a "Wake On Lan" wake-up packet received on the Ethernet interface of the item of equipment EQ that remained active although the item of equipment EQ was in a standby state. For example, the item of equipment EQ is a personal computer, a server, a storage server NAS.

Optionally, it verifies that waking up the item of equipment EQ is allowed. For example, the device 200 obtains information relating to wake-up constraints stored in memory. It consists for example in time constraints recorded in a calendar table, that associates a wake-up authorisation or prohibition with a particular time period. In this case, the period can be expressed in hours or days. The verification consists in this case in verifying that the current day/date/time belongs to an authorised period.

If it is prohibited to wake up the item of equipment EQ during the current period, the device 200 transmits a negative response to the gateway GW.

It is now assumed that waking up the item of equipment EQ is authorised. The device 200 orders in 41 the execution of a wake-up operation for this item of equipment. At this stage, two distinct cases are considered.

According to a first case, the service requested by the user terminal is to access the item of equipment EQ.

The item of equipment executes the wake-up request by activating a human/machine interface, or service portal. It then connects to the gateway GW that sends it information about the actions it has to perform, using line command application messages. In this example, the required action is to allow the user of the terminal TU to access the services offered by the item of equipment. The item of equipment EQ receives in 42 a command for an action to activate the service requested by the client.

It transmits in 431 connection information ICNX to the gateway GW.

Upon receipt of a connection request to its portal from the user terminal TU, said request comprising a user identifier IDU and the connection information, it connects the user. It can also be considered that before authorising the user to use some of its services that require more privileges, the item of equipment QE implements an additional identification/authentication, for example for a switch from user access to administrator access.

In 432, the device 200 obtains access rights of the user stored in memory in association with their identifier and asks them in 433 to select a service from the services they are authorised to access.

Upon receipt of a response from the user terminal comprising a selected service identifier, it obtains in 434 the resource(s) RES to be invoked in order to execute this service, for example in a table TS2 stored in memory as well as an activation state EA of each of these resources. This activation state can be stored in table TS2 or in another table TEA2, for example dedicated to managing activation states.

Advantageously, it also obtains a service configuration script that defines a sequence of actions to be performed by the resources involved to provide the service.

It should also be noted that these resources can be internal to the item of equipment or external, and in this case, accessible in the local network. The device 200 identifies the resources to be activated, that is those that are in an "inactive" or standby state and transmits to them a wake-up message in 435. For external resources, it consists for example in a "Wake on LAN" wake-up packet sent to the IP address of the resource concerned. The device 200 has therefore maintained in memory the entries of a routing table associating the IP address of this resource with its MAC address. For internal resources, this is a function call request via an internal API programming interface.

In 436, the device 200 executes the service according to the script, sending if necessary the appropriate execution commands to the resources RES involved.

In 447, once the service is executed, it sends a confirmation of activation CNF or, if applicable, execution of the service to the user terminal TU. In 49, it deactivates the resources RES that were in a standby state and updates their activation state in memory.

According to the second case, which will now be described in relation to FIG. 4B, it is assumed that the user terminal TU has selected at a service portal of the gateway GW a service managed by the latter. The item of equipment EQ is therefore a resource or a service element that the gateway will invoke when executing the service requested by the user.

In relation to FIG. 4B, the item of equipment EQ receives in 40 a wake-up message and executes in 41 the wake-up request by activating the internal resources specified in the wake-up message. For example, the wake-up message comprises application data for selecting a service with implicit or explicit parameters, or alternatively it is unmarked, but its execution differs depending on the port (IP) to which it is sent.

Alternatively, the wake-up message is a simple ON/OFF instruction and, once woken up, the item of equipment EQ connects to the gateway that sends it line command application messages to specify the internal resources it should activate and the service elements it should execute.

In 42', upon receipt of a command to execute the service from the gateway GW, it executes the service element for which it is responsible, and then reports back to the GW gateway in a confirmation message in 44'.

In 45', the device 200 deactivates the internal resources activated for the execution of the service, at the request of the gateway or after a predetermined period.

In relation to FIG. 5, an embodiment of the method for requesting activation of a service operated by a local communication network from a user terminal according to one embodiment of the development is now presented in the form of a flowchart. In this example, the method is implemented by the device 300.

In a step 50, the device 300 transmits a request RS for activating a service of a local communication network, for example the local network LAN managed by the gateway GW of FIG. 1. It is assumed here that the user terminal has previously remotely connected to the gateway GW. This request RS comprises at least one identifier IDU of the user of the terminal TU. As previously mentioned, the user submits this request via a human/machine interface of their terminal, for example an application implemented by the terminal or a web application. This application can have information relating to services of the local network LAN that the user has already accessed or is authorised to access and offer them to select easily from them the service in which they are interested. In this case, the request RS specifies an identifier IDS of the requested service.

Alternatively, this application can also have a limited quantity of information limited to the IP address of a human/machine interface for managing the services of the local network LAN, or service portal, implemented by the gateway GW. In this case, the request RS is a simple request to connect to this portal.

Optionally, in 51, the device 300 receives a request to select a service from a plurality of services that the gateway GW authorises it to access. It selects the service identifier IDS it is interested in and sends it back to the gateway.

At this stage, two cases are considered.

According to a first case, the requested service S is access to an item of equipment EQ, such as the network-attached storage server NAS of the local network LAN described in relation to FIG. 1. This item of equipment provides various services it manages itself. In particular, it has a human/machine interface or service portal to communicate directly with the user terminal. In this case, it receives in 52 connection information to the service portal of the item of equipment EQ. This includes the IP address of this item of equipment and optionally a port address or a login/password pair. In 53, it sends it a connection request RCNX. Once connected, it selects in 54, at the request of the item of equipment EQ, a service S' from a plurality of services it is authorised to access. In 55, it receives a confirmation of activation of the requested service. For a service that runs without user interaction, such as a presence simulation service, this is an execution confirmation. For a service that requires user interaction, such as checking multimedia files stored in a memory space of the item of equipment EQ, this is an access confirmation.

According to a second case, the requested service is managed by the gateway GW. Once the user has selected in 51 the desired service on the gateway's service portal, the gateway takes steps to activate the service, as previously described. For example, if the selected service is a presence simulation service, the gateway activates the resources invoked by this service that were in a standby state, and then orders the execution of the service. Once the execution is complete, it reports back to the user terminal TU. The device 300 thus receives in 55 a confirmation of execution of the service. If the requested service requires user interaction, the device receives in 55 access to the service, that it thus can use.

Figure 6:
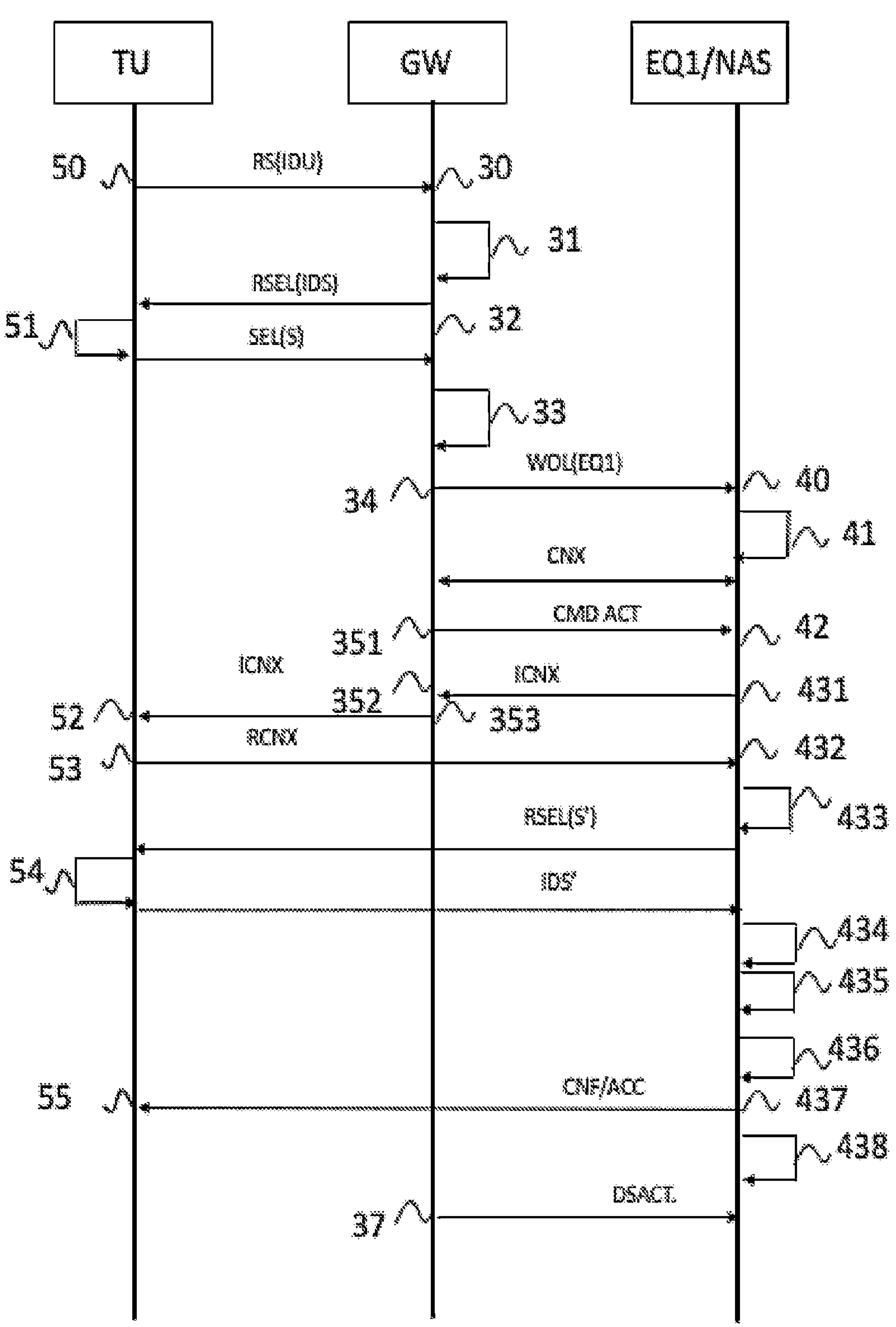
FIG. 6: describes in the form of a flow diagram the exchanges between the user terminal, the gateway to manage the local communication network and the item of equipment of the local network, according to a first embodiment of the development.

In relation to FIG. 6, the exchanges of messages between the user terminal TU, the gateway GW to manage the local network LAN and two items of equipment EQ1, EQ2 of the local network are now presented in the form of a flow diagram, according to a first embodiment of the development.

It is assumed here that the user terminal TU has previously connected to the gateway GW. Since it was in a standby state, it had to be woken up. It is assumed, for example, that the user has previously subscribed to a remote access service to the local network of the gateway GW with their operator and that they access it via a web application or a mobile application they installed on their terminal. For example, they connect to an interface or portal of a remote platform managed by the operator and connected to the network WAN, using a login and a password provided by the operator. This platform verifies that the user is authorised to access the local network of the gateway, wakes it up if necessary, and then connects the gateway and the terminal. Alternatively, the user terminal is configured to wake up the gateway remotely itself, for example by transmitting a "Wake on Wan" wake-up packet, and then to connect to it, without external intervention.

Once connected to the gateway GW, the terminal TU sends it in 50 a request RS to access a service of a local communication network. The gateway receives it in 30. It verifies in 31, based on a user identifier IDU contained in the request RS, that it is authorised for the requested service if the request specifies it and to at least one service otherwise.

Where appropriate, it asks it in 32 to select a service from a plurality of services it is authorised to access. This request RSEL is received in 51 by the user terminal TU, that chooses a service S. Upon receipt of the response, the gateway GW obtains in 33 the local network resources to be invoked in order to implement the selected service S. These resources can be internal to the gateway or external. They can notably be the items of equipment EQ1 and EQ2. It obtains for each of the resources associated with the identifier IDS of the selected service S an activation state EA of the resource. It is an indicator that can take at least two values representative of an active state and an inactive state. In this first example, the requested service S is access to files stored in the network-attached storage server NAS of the local network LAN. The resource concerned is therefore the server NAS that is currently in a standby state. The gateway GW sends it a wake-up message in 34. It is for example a "Wake On Lan" message sent to the IP address of the server NAS. As previously mentioned, this message can be a simple ON/OFF command or a line command enriched with configuration parameters. For example, one of these parameters is a session identifier that can be used later by the item of equipment NAS and/or the gateway GW. The server NAS receives it in 40 and it is assumed it is configured in 41, to activate, in response to this message, at least its home interface or service portal. It connects to the gateway, that sends it in 351 an action command to activate the service requested by the customer. It receives it from the gateway in 42. In this example, the action to be performed is to allow the user to connect to the item of equipment, in order to access the services offered by the latter.

The item of equipment responds in 431 to the gateway by transmitting it connection information ICNX to this portal. It receives them in 352 and retransmits them to the user terminal TU in 353. Upon receipt in 52, the user terminal sends in 53 a connection request to the IP address of the service portal interface of the server NAS, this IP address having been received in the connection information. Its request is received in 432 by the server NAS that connects it. It is assumed here that the service portal of the server NAS offers several services. Examples include read/write access to photos, videos, logs and/or various files, a web server management service, an authorised user management service, the operation of video surveillance cameras, TV reception, etc.

In 433, the server NAS verifies which services the user is authorised to access based on access rights stored in memory in association with the user identifier IDU and asks them to select one. In 54, the user terminal selects the service S'. Examples include checking multimedia files stored in the NAS. Upon receipt, the server NAS obtains in 434 the resources to be invoked for the execution of the service S', for example by checking a table TRES1 associating with an identifier IDS' of the service the identifiers of resources that are associated with it. It also obtains their activation state EA. It is assumed here that the resources to be invoked are internal to the server NAS. These are, for example, internal storage resources, that can be accessed immediately after wake-up, and external storage resources, that can be accessed on demand.

In 435, it wakes up the resources that are in a standby state and updates their activation state in memory (to the value "active"). In 436, it executes the service. In the case of a multimedia file checking service, this involves giving the user terminal access to the memory space of the server NAS that stores the photos. In 437, the server NAS confirms to the user terminal that it has granted it access. For example, the NAS returns to the user terminal a web page showing the contents of a photo album in the form of thumbnails.

The user terminal TU receives this confirmation in 55 and starts using the service S'. When the server NAS detects that the user terminal has finished using the service S' or after a predetermined period, it deactivates the resources in 438 and updates their activation state in memory (to the value "inactive"). Similarly, the gateway GW, when it detects that the user terminal has disconnected from the portal of the server NAS, deactivates the server NAS in 37 and updates its activation state in memory.

Figure 7:
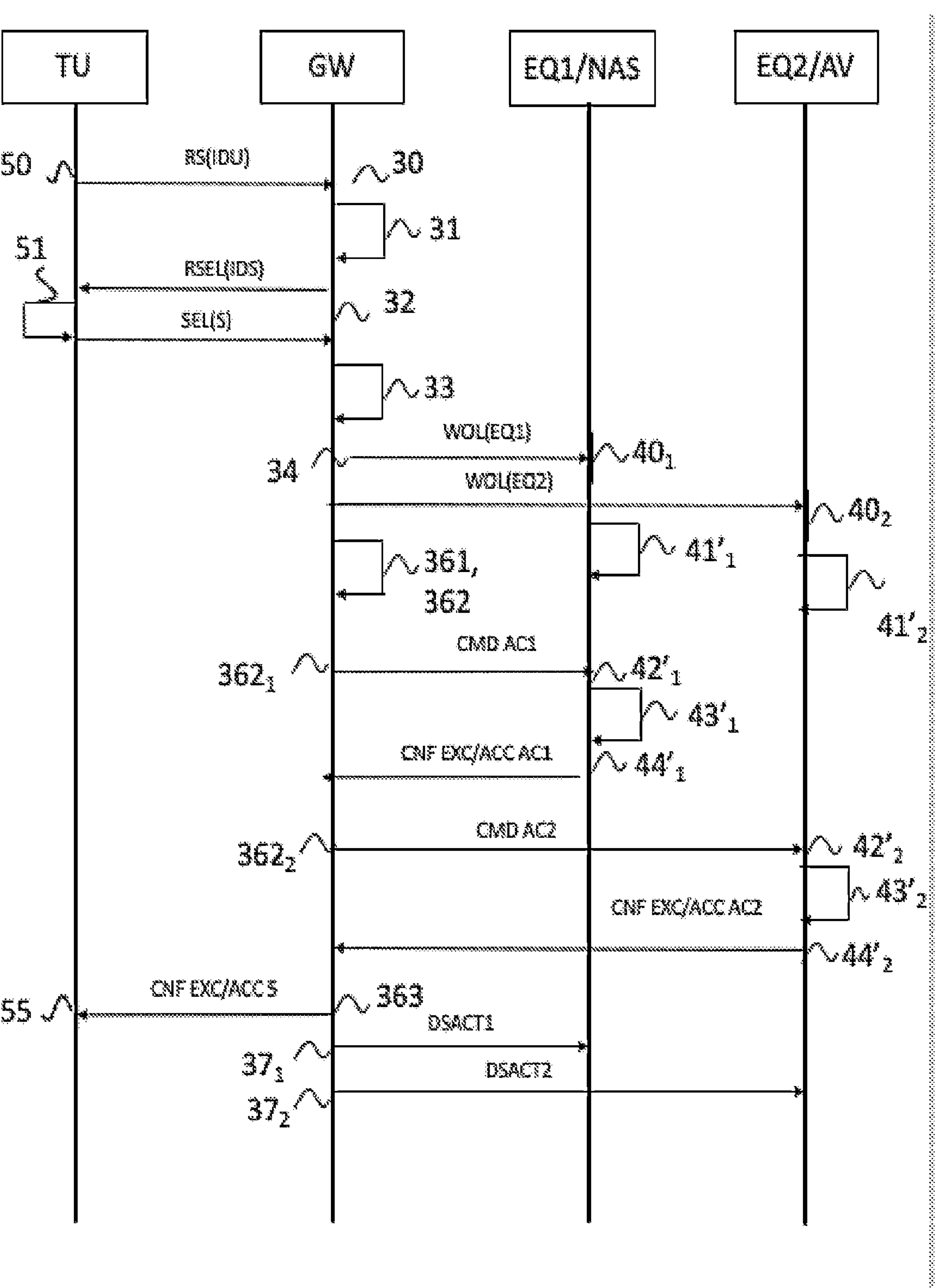
FIG. 7: describes in the form of a flow diagram the exchanges between the user terminal, the gateway to manage the local communication network and the item of equipment of the local network, according to a second embodiment of the development.

In relation to FIG. 7, the exchanges of messages between the user terminal TU, the gateway GW to manage the local network LAN and two items of equipment EQ1, EQ2 of the local network LAN are now presented in the form of a flow diagram, according to a second embodiment of the development.

In this second example, it is assumed that the user terminal TU selects a service S that is managed by the gateway GW. For example, it selected in 51 this service S from a plurality of authorised services that the gateway offered it in 32. Alternatively, it may also have specified an identifier IDS of this service in its initial access request RS. In particular, this is the case when it has an application on its terminal that is sufficiently advanced to directly offer it the services it can access in the local network LAN.

In 33, the gateway obtains the resources to be invoked in order to execute the selected service and their activation state. It is assumed that the service S is a presence simulation service and that it involves resources external to the gateway, for example, the item of equipment EQ1 is the server NAS and the item of equipment EQ2 is the voice assistant AV. The gateway wakes them up in 34, for example by sending them a "Wake on Lan" message. Upon receipt of the wake-up message sent by the gateway in 40'1 and 40'2, each item of equipment wakes up in 41'1 and 41'2. It is assumed here that the item of equipment wakes up the internal resource(s) needed to execute the requested service. These resources to be woken up may or may not be specified in the wake-up message. Indeed, the structure of a "Wake On LAN" wake-up packet comprises a data field of a few bytes, intended to transmit a password. This field could be used to carry an item of information representative of an index of a table associating a sequence of actions to be performed with this index.

In 361, the gateway obtains a service configuration script that describes a sequence of actions to be triggered and of resources to be solicited in order to execute the service. In 362, it executes the script by ordering the item of equipment EQ1/NAS in 362$_1$ to download a sound file stored in one of its memory spaces. The NAS receives the command in 42'1, executes it in 43'1 and transmits the requested file to the gateway in 44'1, which should be considered as a confirmation of execution of the command.

Once it has obtained the requested sound file, the gateway transmits it in 362$_2$ to the voice assistant AV, ordering it to play or broadcast it. Indeed, the voice assistant AV can be instantiated as an integrated terminal or dematerialised as a central processing unit UC with either a stand-alone application or a client for a remote application with input and output sound interfaces (microphone and speakers, amplifiers) and network interfaces. In this second case, the central processing unit broadcasts the file to the remote application so that it plays it.

The voice assistant AV receives the command 42'2 and executes it in 43'2. It confirms the command was correctly executed in 44'$_2$. Once the gateway has obtained confirmation that the service has been executed, it sends in turn in 363 a confirmation to the terminal TU that receives it in 55. Then, it deactivates the items of equipment NAS and AV in 37$_1$ and 37$_2$ and updates their activation state in memory ("inactive" state). It is understood that in order to be effective, a presence simulation service may need to be implemented several times during the absence of the users of the local network LAN. In this case, it can be considered that the service would be activated once by the user but that the associated script provides for several executions, for example at different times of the day or days of the week. In this case, the gateway orders each time waking up the resources to be invoked in order to perform these actions, performing the actions and then deactivating the resources. In this way, the service is executed while controlling the energy consumption of the local network.

Figure 8:
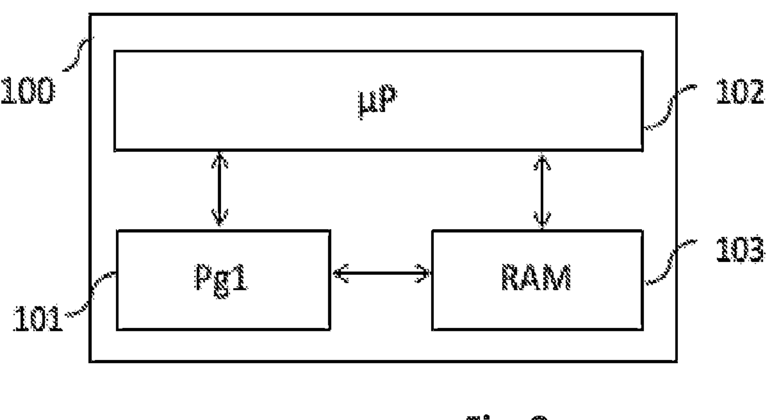
FIG. 8: describes an example of a hardware structure of a device for activating a service operated by a local communication network according to the development.

In relation to FIG. 8, another example of the hardware structure of a device 100 for processing a request for activation of a service operated in a local communication network according to the development, comprising, as illustrated in the first examples of FIGS. 2A and 2B, at least a module for receiving a request to access this service from a user terminal TU, the request comprising at least one user identifier IDU, a module for verifying an authorisation of the user to access the requested service, a module for obtaining resources to be invoked in order to execute the service and an activation state of these resources, a module for waking up the resources configured to transmit a wake-up message to the resources associated with the service when they are in an inactive state and a message for transmitting a confirmation of execution of the service to the user terminal is now presented.

Advantageously, the device 100 further comprises a module for requesting the selection of a service to the user terminal. It can also comprise a module for transmitting a command to the resources for at least one action to be performed, a module for transmitting to the user terminal connection information to a resource configured to implement the service. Finally, it can obtain and execute a service configuration script.

The term “module” can correspond to a software component as well as to a hardware component or a set of hardware and software components, a software component itself corresponding to one or more computer programs or sub-programs, or more generally, to any element of a program capable of implementing a function or set of functions.

More generally, such a device 100 comprises a random access memory 103 (for example, a RAM memory), a processing unit 102 equipped for example with a processor and controlled by a computer program Pg, representative of the reception, verification, obtaining, selection, execution and transmission modules stored in a read-only memory 101 (for example, a ROM memory or hard disk). At initialisation, the code instructions of the computer program are for example loaded into a random access memory 103 before being executed by the processor of the processing unit 102. The random access memory 103 can also contain a table comprising an entry associating access rights to services of the local network with the user identifier. It can also contain a table TRES associating with a service identifier the identifiers of the resources to be invoked for its execution. It can also store in the table TRES or in another table TEA an activation state of each of these resources.

FIG. 8 only shows a particular one of several possible ways of realising the device 100, so that it executes the steps of the method for processing a request for activation of a service operated in a local communication network as detailed above, in relation to FIGS. 3, 6 and 7 in its different embodiments. Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device 100 is realised with a reprogrammable computing machine, the corresponding program (that is the sequence of instructions) can be stored in a removable (such as, for example, an SD card, a USB flash drive, CD-ROM or DVD-ROM) or non-removable storage medium, this storage medium being partially or totally readable by a computer or a processor.

The various embodiments have been described above in relation to a device 100 integrated into a gateway GW to access a remote communication network WAN and configured to manage the local communication network LAN, but it may also be independent of the gateway and connected to it via an interface of the local network LAN.

Figure 9:
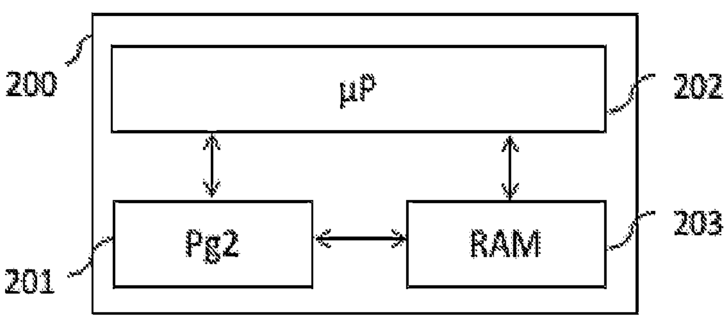
FIG. 9: describes an example of a hardware structure of a device for waking up an item of equipment of the local network, configured to implement the service according to the development.

In relation to FIG. 9, another example of the hardware structure of a device 200 for processing a wake-up request received by an item of equipment EQ connected to a local communication network LAN according to the development is also shown, comprising, as illustrated in the examples of FIGS. 2A and 2B, at least a module for receiving a wake-up message from the gateway, a module for receiving a command for at least one action to be performed from the gateway GW, a module for waking up the item of equipment EQ, a module for executing the service or an element of the requested service, a module for confirming the execution to the gateway.

Advantageously, the device 200 also comprises, according to the embodiment of FIG. 2B, a module for connecting the user terminal, a module for requesting the selection of a service S' managed by the item of equipment EQ, a module for verifying an authorisation of the user to access the requested service, a module for obtaining resources to be invoked in order to implement the service S' and an activation state of these resources, a module for waking up the resources whose activation state is “inactive” and a module for ordering these resources to execute the service S'.

The term “module” can correspond to a software component as well as to a hardware component or a set of hardware and software components, a software component itself corresponding to one or more computer programs or sub-programs, or more generally, to any element of a program capable of implementing a function or set of functions.

More generally, such a device 200 comprises a random access memory 203 (a RAM memory, for example), a processing unit 202 equipped for example with a processor and controlled by a computer program Pg2, representative of the reception, activation, connexion, verification, selection, obtaining, wake-up and execution modules, stored in a read-only memory 201 (a ROM memory or hard disk, for example). At initialisation, the code instructions of the computer program are for example loaded into a random access memory 203 before being executed by the processor of the processing unit 202. The random access memory 203 can also contain a table comprising an entry associating an access right to the services managed by the item of equipment with the user identifier IDU. It can also contain a table TS2 associating with an identifier of the requested service the identifiers of the resources to be invoked in order to execute the service. Finally, it can store an activation state of each of these resources in the table TS2 or in another dedicated table TEA2.

FIG. 9 only shows a particular one of several possible ways of realising the device 200, so that it executes the steps of the method for processing a wake-up request as detailed above, in relation to FIGS. 4A, 4B, 6 and 7 in its different embodiments. Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device 200 is realised with a reprogrammable computing machine, the corresponding program (that is the sequence of instructions) can be stored in a removable (such as, for example, an SD card, a USB flash drive, CD-ROM or DVD-ROM) or non-removable storage medium, this storage medium being partially or totally readable by a computer or a processor.

Figure 10:
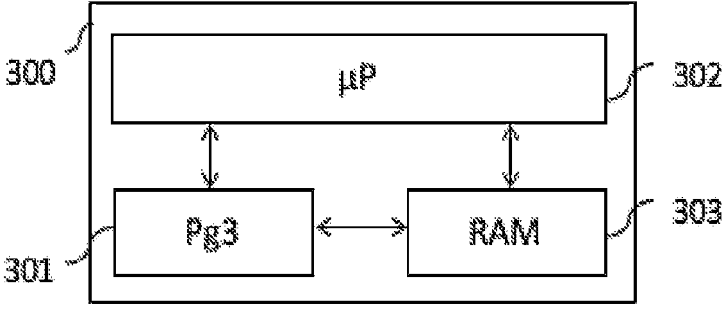
FIG. 10: describes an example of a hardware structure of a device for requesting access to a local communication network according to the development.

Finally, in relation to FIG. 10, an example of the hardware structure of a device 300 for requesting activation of a service operated in a local communication network according to the development is presented, comprising at least a module for sending a request for activation of a service to the gateway GW and a module for receiving a confirmation of activation of the requested service.

Advantageously, the device 300 also comprises a module for selecting a service from a plurality of services authorised by the gateway for the user terminal, a module for receiving connection information to an item of equipment of the local network configured to manage the requested service, a module for connecting to said item of equipment and a module for selecting a service from a plurality of services S' authorised by the item of equipment.

The term "module" can correspond to a software component as well as to a hardware component or a set of hardware and software components, a software component itself corresponding to one or more computer programs or subprograms, or more generally, to any element of a program capable of implementing a function or set of functions.

More generally, such a device 300 comprises a random access memory 303 (for example, a RAM memory), a processing unit 302 equipped for example with a processor and controlled by a computer program Pg, representative of the transmission, selection, reception and connection modules, stored in a read-only memory 301 (for example, a ROM memory or hard disk). At initialisation, the code instructions of the computer program are for example loaded into a random access memory 303 before being executed by the processor of the processing unit 302. The random access memory 303 can also contain a table comprising an entry associating with the user identifier ID the identifiers of services it has already activated.

FIG. 10 only shows a particular one of several possible ways of realising the device 300, so that it executes the steps of the method for requesting activation of a service as detailed above, in relation to FIGS. 5, 6 and 7 in its various embodiments. Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device 300 is realised with a reprogrammable computing machine, the corresponding program (that is the sequence of instructions) can be stored in a removable (such as, for example, an SD card, a USB flash drive, CD-ROM or DVD-ROM) or non-removable storage medium, this storage medium being partially or totally readable by a computer or a processor.

The development that has just been described in its different embodiments has many advantages. In particular, it facilitates the task of a user who wants to remotely activate a service operated in a local communication network placed in a standby state, while ensuring the security of the equipment of that network. Indeed, thanks to the development, the user only has to request activation of the service to the gateway, without worrying about the fact that some resources of the local network may be in a standby state or not. The gateway orchestrates from end to end the wake-up of these resources and the execution of the requested service.

By enabling simple and secure remote access to the services of the local network, the development therefore encourages users to place their equipment in a standby state when they are away, and thus contributes to saving energy resources.

The invention claimed is:

1. A method of processing a request for activation of a service operated by a local communication network managed by a gateway to access a remote communication network, wherein the method is implemented by the gateway and comprises:

receiving a request for activation of at least service from a user terminal connected to the gateway, the request comprising at least one user identifier;

verifying a user's authorization to activate the at least one service of the network from access rights stored in memory in association with the user identifier;

obtaining, from a service identifier, at least one identifier of at least one resource of the local network to be invoked in order to execute the service; and checking an activation state of the at least one resource, and when the at least one resource is in a standby state, transmitting a wake-up message to the at least one resource.

2. The method of processing a service activation request according to claim 1, wherein, when the at least one resource is an item of equipment of the local network, distinct from the gateway, configured to manage the service, the method comprises, following the waking up of the item of equipment, transmitting a command for performing at least one action to activate the service, receiving connection information of the user terminal to the item of equipment, and transmitting the information to the user terminal of the connection information.

3. The method of processing a service activation request according to claim 1, wherein, when several resource identifiers are associated with the service identifier, the method further comprises obtaining a service configuration script defining a time sequence of actions to be performed by the resources and, following the waking up of the resources and their connection to the gateway, ordering the resources to perform the actions in accordance with the script.

4. The method of processing a service activation request according to claim 1, wherein the method comprises transmitting to the user terminal a request to select a service identifier from a plurality of service identifiers provided by the local network and authorized by the access rights stored in memory in association with the user identifier.

5. A processing circuit comprising a processor and a memory, the memory storing program code instructions of a computer program for executing the method according to claim 1, when the computer program is executed by the processor.

6. A method of processing a wake-up request from a gateway to access a remote network, the gateway being configured to manage a local network, wherein the method is implemented by an item of equipment connected to the local network and comprises:

upon receipt of a wake-up message from the gateway, activating at least one human/machine interface for managing services operated by the item of equipment;

receiving a command from the gateway for at least one action to be performed to activate at least one service requested by a user terminal; and performing the at least one action, comprising when the action to be performed is to activate for a user the at least one service implemented by the item of equipment:

transmitting, to the gateway, connection information to the at least one human/machine interface;

upon receipt of a connection request on the interface from the user terminal connected to the gateway:

verifying that the user is authorized to access the at least one service from access rights stored in a memory in association with a user identifier comprised in a request for activation of the at least one service, obtaining, from a service identifier, at least one identifier of at least one resource of the local network to be invoked in order to execute the service, checking an activation state of the at least one resource, and when the at least one resource is in an inactive state, transmitting the wake-up message to the at least one resource.

7. A method of requesting activation of a service operated by a local communication network managed by a gateway to access a remote communication network, wherein the method is implemented by a user terminal connected to the gateway and comprises:

transmitting a request for activation of a service to the gateway, the request comprising at least one user identifier used by the gateway to verify a user's authorization to activate the service;

receiving connection information to an item of equipment connected to the local network and configured to implement the service;

transmitting a connection request to the item of equipment comprising the connection information; and receiving, from the item of equipment, a confirmation of complete execution of the service.

8. The method of requesting activation of a service according to claim 7, wherein the method comprises a selection of a service from a plurality of services authorized for the user terminal.

9. A device for processing a request for activation of a service operated by a local communication network managed by a gateway to access a remote communication network, wherein the device is configured to implement at the gateway:

receiving a request for activation of a service from a user terminal connected to the gateway via the remote communication network, the request comprising at least one user identifier;

verifying a user's authorization to activate the service from access rights stored in a memory in association with the user identifier;

obtaining, from a service identifier, at least one identifier of at least one resource of the local network to be invoked in order to execute the service;

checking an activation state of the resource; and when the at least one resource is in an inactive state, transmitting a wake-up message to the at least one resource.

10. A device for processing a wake-up request from a gateway to access a remote network, the gateway being configured to manage a local network, wherein the device is configured to implement at an item of equipment connected to the local network:

upon receipt of a wake-up message from the gateway, activating at least one human/machine interface for managing services operated by the item of equipment;

receiving a command from the gateway for at least one action to be performed to activate at least one service requested by a user terminal; and performing the at least one action, comprising when the action to be performed is to activate for a user a service implemented by the item of equipment:

transmitting, to the gateway, connection information to the at least human/machine interface;

upon receipt of a connection request on the interface from the user terminal connected to the gateway:

verifying that the user is authorized to access the at least one service from access rights stored in a memory in association with a user identifier comprised in a request for activation of the at least one service, obtaining, from a service identifier, at least one identifier of at least one resource of the local network to be invoked in order to execute the service, checking an activation state of the at least one resource and, when the at least one resource is in an inactive state, transmitting the wake-up message to the at least one resource.

11. A device for requesting activation of a service operated by a local communication network managed by a gateway to access a remote communication network, wherein the device is implemented by a user terminal connected to the gateway and is configured to:

transmit a request for activation of a service to the gateway, the request comprising at least one user identifier used by the gateway to verify a user's authorization to activate the service;

receive connection information to an item of equipment connected to the local network and configured to implement the service;

transmit a connection request to the item of equipment comprising the connection information; and receive, from the item of equipment, a confirmation of complete execution of the service.

12. A system for managing a request for activation of a service operated by a local communication network received from a user terminal connected to a gateway, wherein the system comprises the gateway to access a remote communication network and configured to manage the local communication network, wherein the gateway comprises a third device for processing a request for activation of the service operated by the local communication network, wherein the third device is configured to implement at the gateway:

receiving the request for activation of a service from the user terminal connected to the gateway via the remote communication network, the request comprising at least one user identifier;

verifying a user's authorization to activate the service from access rights stored in a memory in association with the user identifier;

obtaining, from a service identifier, at least one identifier of at least one resource of the local network to be invoked in order to execute the service;

checking an activation state of the at least one resource; and when the at least one resource is in an inactive state, transmitting a wake-up message to the at least one resource;

wherein the user terminal comprises a first device for requesting activation of the service operated by the local communication network managed by the gateway, wherein the first device is implemented by the user terminal connected to the gateway and is configured to:

transmit the request for activation of the service to the gateway, and receive a confirmation of execution of the service, the terminal being configured to issue the request for activation of the service, and an item of equipment connected to the local communication network wherein the item of equipment comprises a second device for processing the wake-up request from the gateway to access the remote communication network, wherein the second device is configured to implement at the item of equipment connected to the local communication network:

upon receipt of the wake-up request from the gateway, activating at least one human/machine interface for managing services operated by the item of equipment;

receiving a command from the gateway for at least one action to be performed to activate a service requested by the user terminal; and performing the at least one action.

* * * * *